UNITED STATES PATENT OFFICE.

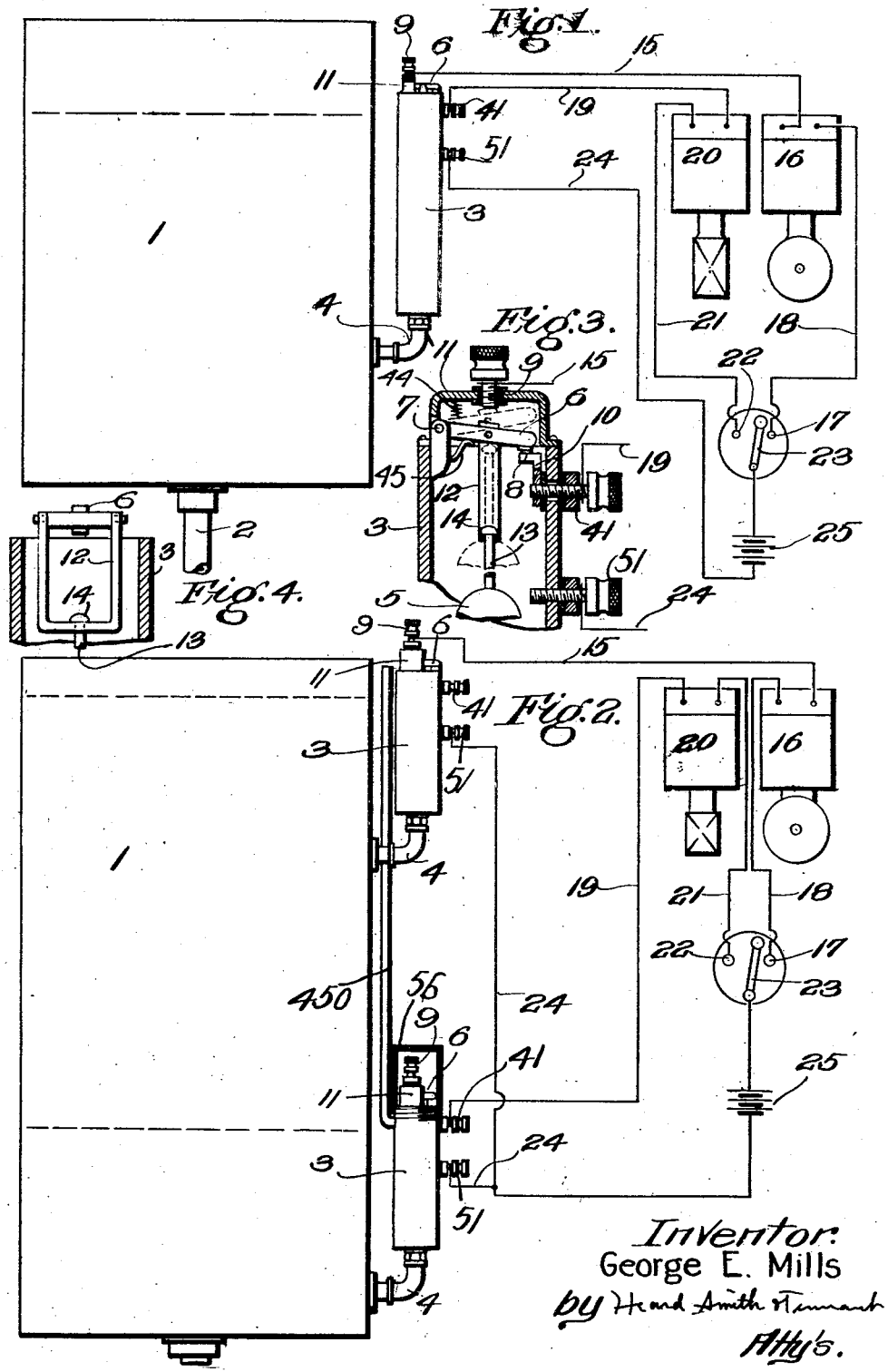

GEORGE E. MILLS, OF WATERTOWN, MASSACHUSETTS.

CIRCUIT-CLOSER FOR LIQUID-LEVEL INDICATORS.

1,337,252.

Specification of Letters Patent.   Patented Apr. 20, 1920.

Application filed March 11, 1919.  Serial No. 282,026.

*To all whom it may concern:*

Be it known that I, GEORGE E. MILLS, a citizen of the United States, residing at Watertown, county of Middlesex, State of Massachusetts, have invented an Improvement in Circuit-Closers for Liquid-Level Indicators, of which the following description, in connection with the accompanying drawing, is a specification, like characters on the drawing representing like parts.

This invention has for its object to provide a novel device which is to be used in connection with a tank or receptacle containing a liquid to indicate when the level of the liquid reaches a predetermined low or predetermined high point. The device is especially useful in connection with oil cups or oil tanks that are associated with some machine and from which oil is delivered to a bearing or bearings, for when used in this way the signal will automatically indicate when the level of the oil in the receptacle gets below a predetermined point thereby preventing the oil from becoming entirely exhausted with consequent injury to bearings that should be kept lubricated.

In order to give an understanding of my invention, I have illustrated in the drawings some selected embodiments thereof which will now be described, after which the novel features will be pointed out in the appended claims.

Figure 1 is a view showing one embodiment of my invention;

Fig. 2 shows a different embodiment.

Fig. 3 is an enlarged sectional view of the upper end of the float receiving chamber in Fig. 1;

Fig. 4 shows the connection between the float and the contact member.

In Fig. 1, 1 indicates a receptacle adapted to contain liquid. So far as the invention is concerned, this receptacle might be for any purpose. The receptacle herein shown is intended to contain lubricating oil and has a discharge pipe 2 connected thereto which leads to a bearing to be lubricated. 3 indicates a float-receiving chamber which is connected to the receptacle 1 by means of a suitable pipe 4 so that the level of the liquid in the chamber 3 will always be the same as that in the receptacle 1. Situated in this chamber 3 is a float 5 which is connected to a suitable contact member 6 that is pivoted to the wall of the chamber 1 at 7. This contact member 6 plays between two contacts 8 and 9, both of which are insulated from the chamber 3. The contact 8 is shown as carried by an L-shaped member 10 which is secured to the wall of the chamber 3 by the binding post 41, said contact being insulated from the chamber. The contact 9 is shown as carried by but insulated from a bridge member 11 which is secured to the top of the receptacle 3.

The contact 6 is normally held in a midway position between the contacts 8 and 9 by means of two springs 44 and 45, said springs permitting the contact 6 to swing up or down into engagement with the contacts 9 or 8, as will be presently described.

The connection between the contact 6 and the float 5 is a loose connection which permits the float 5 to have considerably more movement than the contact 6. The contact is shown as having a yoke member 12 depending therefrom through which extends a stem 13 rising from the float 5, said stem passing loosely through the yoke and having a head 14 thereon. The spring 45 is insufficient to support the weight of the float 5 so that when said float is sustained by the yoke 12, as shown in Fig. 3, the contact 6 will be swung downwardly against the action of the spring 45 into engagement with the contact 8. On the other hand, if the chamber 3 becomes filled with liquid and the float 5 is thereby raised, the float will first move upwardly to carry the stem thereof through the yoke 12 until the float assumes the dotted line position Fig. 3, and then further lifting movement of the float will raise the yoke 12 and the contact 6 against the action of the spring 44, thereby closing the contact 6 onto the contact 9. The contact 9 is connected by a wire 15 to a signal 16 and the latter is connected to a switch contact 17 by a wire 18. The contact 8 is connected by a wire 19 to another signal 20, said signal being connected by a wire 21 to a switch contact 22. 23 is a switch member adapted to engage either the contact 17 or 22, said switch member being connected to a battery 25. The chamber 3 has a ground terminal 51 which is connected to the battery by the return wire 24.

Assuming that the receptacle 1 is filled with oil and that the switch member 23 is on the switch contact 22, it will be seen that the float 5 will be in its elevated position with the stem 13 projecting up through the yoke 12 and with the float engaging said yoke and holding the contact 6 in engagement with the contact 9 against the action of the spring 44.

As the liquid is drawn out of the receptacle 1 the liquid level in the chamber 2 will gradually fall and the float will, of course, move downwardly with the liquid level. As soon as the float moves downwardly to such a point that it has no lifting effect on contact 6 this contact will be swung off from the contact 9 by the action of the spring 44. The spring 45, however, will support the weight of the contact 6 and hold it in a midway position out of engagement with the contact 8. When the liquid level reaches a predetermined low point, then the head 14 of the stem 13 will engage the yoke 12 and draw the contact 6 down onto the contact 8 against the action of the spring 45. Since the switch 23 is on the switch contact 22, the circuit including the signal 20 will be closed as soon as the contact 6 engages the contact 8, and said signal will thus be sounded. This will give indication that the liquid has reached the predetermined low level and that the supply should be replenished.

When liquid is to be added to the receptacle 1, the switch 23 will be turned onto the contact 17, and as the liquid is added the float 5 will rise. As soon as the weight of the float is taken off from the contact 6, the spring 45 will raise the latter into its central position. When the float has risen sufficiently so that it will engage the yoke, as shown in dotted lines, Fig. 3, then further rising movement of the float will force the contact 6 upwardly against the action of the spring 44 to bring said contact into engagement with the contact 9. This will close the circuit through the signal 16 and will indicate that the predetermined high level has been reached. The operator will then turn the switch 23 onto the contact 22 so that when the predetermined low level has been again reached, the signal 20 will be sounded. In this embodiment of the invention the distance between the high and low levels is determined by the length of the stem 13 and the amount of lost motion between the float and the contact 6.

In Fig. 2 I have illustrated a different embodiment of my invention which may be used where a greater range between the high and low levels is desired. In this embodiment, the receptacle 1 has two chambers 3 connected thereto, one at the top and one at the bottom. Each chamber contains the float 5 and the contacts 6, 8 and 9, all as described in Fig. 1. In this embodiment, however, each float 5 may be connected directly to its contact 6. Where this embodiment is used, the contact 9 of the upper chamber 3 will be connected to the high level signal 16, and the contact 8 for the lower chamber 3 will be connected to the low level signal 20. Both the receptacles 3 are connected to the return 24. When the receptacle is filled both floats 5 will be raised so that both contacts 6 will be held against the contacts 9, but since the contact 9 of the lower receptacle 3 is a dead contact no signal will be sounded except from the upper contact 9. As the liquid is drawn out of the receptacle 1 the float in the upper chamber 3 will first move downwardly thereby closing the contact 6 onto the contact 8 of the upper chamber, but since said contact 8 is a dead contact there will be no result from this. When the predetermined low level has been reached, then the float 5 in the lower chamber will move downwardly, thus closing the lower contact 6 onto the contact 8 which is connected to the signal 20. This will cause the signal to sound to give the desired indication.

The lower chamber 3 has a breather pipe 450 connected thereto which extends above the predetermined upper liquid level, said pipe being for the purpose of preventing air from becoming trapped in said chamber.

The upper end of the lower chamber 3 in Fig. 4 is closed by a cap 56 to prevent the liquid from escaping.

I claim:

1. In a device of the class described, the combination with a receptacle to contain liquid, of a chamber connected thereto, a contact member pivoted to said chamber, two contacts, one situated above and the other below the contact member, two springs acting on the contact member and normally holding it out of contact with both contacts, a float in the chamber, and connections between said float and contact member by which the float will close said member against the upper contact when it reaches a predetermined high level and against the lower contact when it reaches a predetermined low level.

2. In a device of the class described, the combination with a chamber, of a contact member pivoted thereto, two contacts, one situated above and the other below the contact member, a spring device for holding the contact member yieldingly in central position, a yoke depending from the contact member, a float in the chamber having a stem loosely extending through an aperture in the yoke and provided at its upper end with a head whereby when the float reaches a predetermined high level it will lift the contact member into engagement with the upper contact and when it reaches a predetermined low level it will lower the contact member into engagement with the lower contact.

In testimony whereof I have signed my name to this specification.

GEORGE E. MILLS.